(12) United States Patent
Levon

(10) Patent No.: US 8,147,082 B2
(45) Date of Patent: *Apr. 3, 2012

(54) VERSATILE SAFETY REFLECTORS

(76) Inventor: Leif Eric Tobias Levon, Älta (SE)

( * ) Notice: Subject to any disclaimer, the term of this patent is extended or adjusted under 35 U.S.C. 154(b) by 302 days.

This patent is subject to a terminal disclaimer.

(21) Appl. No.: 12/384,221

(22) Filed: Apr. 2, 2009

(65) Prior Publication Data
US 2009/0303727 A1 Dec. 10, 2009

(30) Foreign Application Priority Data

| Jun. 4, 2008 | (GB) | ................................ 0810263.4 |
| Jul. 31, 2008 | (GB) | ................................ 0813946.1 |
| Jan. 28, 2009 | (GB) | ................................ 0901332.7 |

(51) Int. Cl.
*F21K 2/00* (2006.01)
(52) U.S. Cl. ..................... 362/84; 362/296.07; 362/300; 362/298

(58) Field of Classification Search .................... 362/84, 362/473, 477, 517, 521, 217.07, 217.08, 362/298, 300, 296.07, 311.09
See application file for complete search history.

(56) References Cited

U.S. PATENT DOCUMENTS

| 1,470,777 | A | * | 10/1923 | Tabb ................................ 441/16 |
| RE24,372 | E | * | 10/1957 | Franck .......................... 362/309 |
| 4,384,317 | A | * | 5/1983 | Stackpole ..................... 362/183 |
| 4,912,605 | A | * | 3/1990 | Whitehead ..................... 362/558 |
| 5,570,945 | A | * | 11/1996 | Chien et al. ..................... 362/84 |
| 6,139,174 | A | * | 10/2000 | Butterworth .................. 362/555 |
| 6,186,635 | B1 | * | 2/2001 | Peterson et al. ................. 362/84 |
| 6,411,438 | B1 | * | 6/2002 | Itoh et al. ................. 359/489.07 |
| 6,866,394 | B1 | * | 3/2005 | Hutchins et al. .............. 362/192 |
| 7,246,917 | B2 | * | 7/2007 | Rhoads et al. ................. 362/241 |
| 2004/0174696 | A1 | * | 9/2004 | Buelow et al. .................. 362/84 |
| 2009/0147523 | A1 | * | 6/2009 | Levon ...................... 362/296.01 |
| 2009/0302739 | A1 | * | 12/2009 | Levon ........................... 313/483 |

* cited by examiner

*Primary Examiner* — Sharon Payne
(74) *Attorney, Agent, or Firm* — Maier & Maier, PLLC

(57) ABSTRACT

A Safety reflector suitable as a road stud or hazard reflecting ornament able to utilize ambient light without solar panels batteries or diodes, in order to reflect light multi-dimensionally.

14 Claims, 11 Drawing Sheets

VERSATILE SAFETY REFLECTORS

Figure 1:
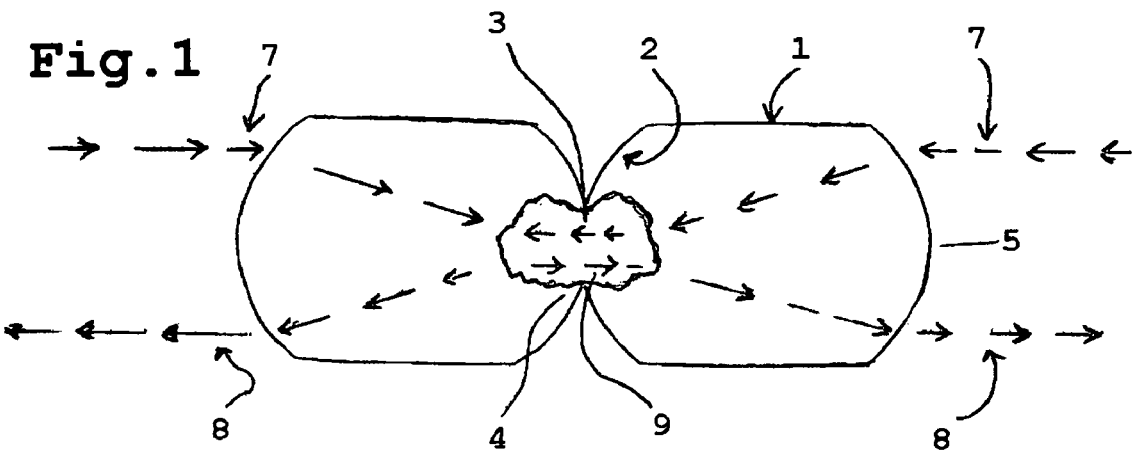

The present application for patent claims priority to patent applications: U.S. Ser. No. 12/288,409 and GB0901332.7

FIELD OF INVENTION

This invention relates to road studs, safety reflecting devices and hazard markers.

BACKGROUND

Reflectors are used widely to secure a safer environment for cyclists, pedestrians, mariners, aviators and others by reflecting back light from a light source.

Road reflectors have been proven to be highly effective by providing an alert system to prevent drivers from straying off road or out of lanes, helping to reduce accidents and save lives.

Mr. Percy Shaw invented a reflecting lens road stud, which reflected headlights back to motorists in order to demarcate the side of roads, assisting in keeping cars and other vehicles on the road and out of the way of oncoming traffic.

The reflecting lens was originally invented by Richard Hollis Murray, and consists of a glass body lens with a concave mirror coated rear side.

Prior art may be exemplified by: GB436290/GB457536/GB1187663/GB2041047/GB2041047/GB2190123/GB2075094/U.S. Pat. Nos. 3,693,511/5,529,430/5,513,924/4,088,416/4,889,409/5,624,175.

SUMMARY

Some reflectors are described as road safety retroreflective raised pavement markers, and are designed to draw attention to changes in the road infrastructure, and provide a means of increasing the warning distance for drivers to reduce or adjust their speed according to prevailing circumstances.

Present road reflectors are not so efficient during rain and overcast conditions.

It is therefore the intention of the invention to provide a more visible safety reflector device during these adverse environmental conditions, and hence reduce accidents for pedestrians, cyclists, trucks, baby prams, snow mobiles, boats and all other motorists and vehicles.

Another object with the invention is to enable safety reflectors to emit light in more than one direction, inspite of received light appearing or originating from one direction only.

Additionally, versatile safety reflectors may be easily combined with other internal light sources such as electro luminescence, and diodes powered by induction, photovoltaicly or thermoelictrically.

Since versatile safety reflectors are operational even after batteries and diodes malfunction or break, they will maintain essential safety standards.

Versatile safety reflectors may be made in a variety of shapes, sizes, colours and forms in order to comply with road administrative authorities, capable of reflecting bi-directionally, multi-directionally or 360 degrees, and provide clearer traffic guidance in all weather conditions.

Versatile safety reflectors may act as delineators such as tall pylons, traffic cones or bollards mounted along edges of roads and used to channelize traffic or inform about lane closures or generally to direct traffic.

Rigid reflecting posts may be arranged to close a road or path, or allow access for service routes and emergency entrances and exits.

Versatile safety road reflectors may be glued to road surfaces, partially sunk and anchored to the tarmac/macadam or remain motile. Other safety reflectors may be modified and made suitable for automobiles, motorcycles, bicycles and other vehicles.

Retractible reflecting bollards, equipped with versatile safety reflectors, may be lowered into the ground when necessary, and flexible reflecting flaps or fins may be deployed to allow vehicles to drive over them allowing access when needed.

Other types of bollards in the shape of reflecting poles may be employed as gates in ski slopes or ski poles and sticks for skiers. General private and public gates and fences may be supplied with safety reflectors to enhance security as well as behaving decoratively.

Pedestrians or hikers having hanging or attached ornamental safety reflectors will appear more visible as they walk along country roads or narrow pavements.

Reflecting traffic cones inform of roadworks and other hazards and may be combined with traditional retroreflective sleeves or additional reflective white bands.

Versatile road reflectors may of course also be used in combination with audio-visual studs. These are road studs which alert drivers of potential dangers by causing tactile vibrations and audible rumbling noises transmitted through a vehicles suspension mechanism.

Warning triangles can be covered with several versatile safety reflectors, enabling them to shine multi-directionally adding to road safety during vehicle break-down. Improved safety studs will not only increase security along highways and act as speed breakers, they are also useful near zebra crossings, construction sites, railway road crossings, hospitals, parking lots, schools, sign posts, guard rails and act as pavement and verge markers.

Besides reflecting projected light back in the direction of it's site of origin, safety reflectors have the ability to collect natural ambient light from their surroundings and emit a more visible pronounced light with or without the assistance of luminaries, making them more perceptable than traditional prior art studs.

The ability of safety reflectors to act as both light reflectors and light collectors is taken advantage of in order to stimulate photons/electrons within luminescent material adjoining one or more reflectors or reflecting lenses.

Versatile safety reflectors may be comprised of two or more reflecting lenses or reflectors connected by luminescent material adjoining apertures along their reflective surfaces.

For example a safety reflector may consist of two reflecting lenses pierced and joined at their rear reflecting ends by suitable luminescent/fluorescent material made of glass or synthetic material. Light entering either side will tend to excite luminescent material to a higher energy level, which in turn will emit light on both sides perceived to be brighter than comparable prior art modules.

Single units comprising a reflecting lens with luminescent material lodged through one or more suitable windows along the reflective surface may emit light independently of additional lenses but will appear weaker and less efficient. However several units assembled together in this manner may pick up ambient light rays as well as beams from passing headlights, spanning 360 degrees, and appear more luminous in all directions.

Connecting light collecting reflectors in the shape of cones, pyramids, parabolas or troughs to luminescent material in conjunction with safety reflectors will enhance propagation of light. Other variations may include internally reflecting double cones or hyperbole or parts thereof, receiving, collecting, concentrating and transmitting light to and from housed luminescent material. Reflecting surfaces may be lined with luminescent material, which in turn merge with the main luminescent body member. Coloured luminescent or clear spherical lenses or prisms may be lodged between adjoing hyperbolic or other shaped reflectors.

Polarizing layers of crystal sheets covering parts of variously coloured luminescent materials, may be electrically activated by photovoltaic means in order to create intermittent coloured light displays. This is achieved simply by alternately allowing light to pass through the polarizing layer at set intervals.

For example when green and yellow light is blocked at certain times the stud will appear red, and when yellow and red light is hindered, green is emphasized Supplementary diode lamps encased within the safety reflector may be powered by solar cells, or transferring energy from a distantly located primary coil to a secondary coil near or within the reflector device. Even thermoelectric methods may be employed to supply energy to both electro-luminescent material and polarizing layers. A potential difference may be achieved by having reflectors made of different metals, or adjoing metal poles and harnessing currents resulting from temperature differences.

Light collecting parts surrounding the luminescent body and material may be further modified using lenses, prisms with or without light collecting reflectors. Thin Fresnel lenses with short focal length may be beneficial in certain stud models in order to concentrate light toward reflectors or luminescent material.

Reflective compartment may be hollow or filled with transparent material such as glass or synthetic material, and reflective walls may be concave, parabolic, elongated trough reflectors, or converging tapered cones and pyramids or parts thereof.

Luminescent bodies may be solid, liquid or gas containing organic or inorganic dyes which luminesce/fluoresce when struck by light or other radiant energy.

Luminescent bodies in the shape of sheets, rods and fibres tend to conduct light from one end to the other, or from one side to other sides, while other regular or irregular shapes may receive and transmit light from their entire surface area.

Luminescent bodies may be made of glass, minerals, silicone, rubber or synthetic material, and possess favourable light receiving and transmitting shapes or surfaces such as fresnel, hologram, laser grooves, multifaceted with several aspects and phases, covered with dome shaped lenses, crystal or prismatic structures.

Reflecting surfaces may likewise acquire properties which may promote reflection similar to those stated above, as well as contain luminescent materials or layers.

Certain fluorescent or luminescent material may fluoresce or luminesce respectively in association with vacuum, noble gases, radio active materials, inorganic or organic dyes, metals and minerals and also within pressurized compartments.

Reflectors may have a plurality of refracting lenses or prismatic covers maximizing the amount of visible light transmitted to motorists and others, as well as guiding light to be received in order to activate luminescent material.

Safety Road Triangles may have several rows of two way safety reflectors sandwiched in-between reflective sheets supporting the sides of a triangle.

Light will then be reflected both ways from an approaching beam of light, and will be visible for other motorists coming from the opposite side of the road or in a bend or blind corner of the road. Traditional safety triangles need to receive light from both directions in order to achieve a similar safety standard.

Flexible or rigid reflecting poles may have several horizontal layers of safety reflectors composed of multiple versatile reflectors set in circular formation joined at their tapered ends to luminescent material in order to receive and transmit light around the poles circumference.

Alternatively poles may be composed of vertical reflecting fins arranged as spoke wheels fanning out from a hub or central point housing luminescent material. The fins will then appear as perpendicular oblong reflecting trough reflectors able to receive and transmit light from their outer boundary.

Safety reflectors attached to lamp posts or placed in the vicinity of street lamps will be able to shine 24 hours a day, using ambient light by day and stray light from it's host lamp during nocturnal conditions.

Cyclists and others will benefit both from stationary reflectors placed along roadways or designated cycle paths, as well as when carrying dynamic reflectors onboard their vehicles or worn ornamentally by drivers and passengers, owing to the fact that moving objects accompanied by lights become instantly more observable, heightening awareness levels of fellow citizens. Versatile safety reflectors may be worn as pliable straps made according to descriptions applying to reflecting poles mentioned earlier or simply as reflectors affixed to helmets.

Compared to regular reflectors, versatile safety reflectors are more beneficial since they not only reflect light back towards a light sources, but also convert invisible light such as ultra violet light of shorter wavelength, into more visible light of longer wavelength, and emit this light in at least two directions perceivable by the human eye.

INTRODUCTION TO DRAWINGS:

FIG. 1. Shows a side view of two reflecting lenses joined together at their rear reflecting bases, where each aperture interconnects with a luminescent body promoting production of light and able to deliver light to either section, regardless of direction of received radiant energy.

Figure 2:
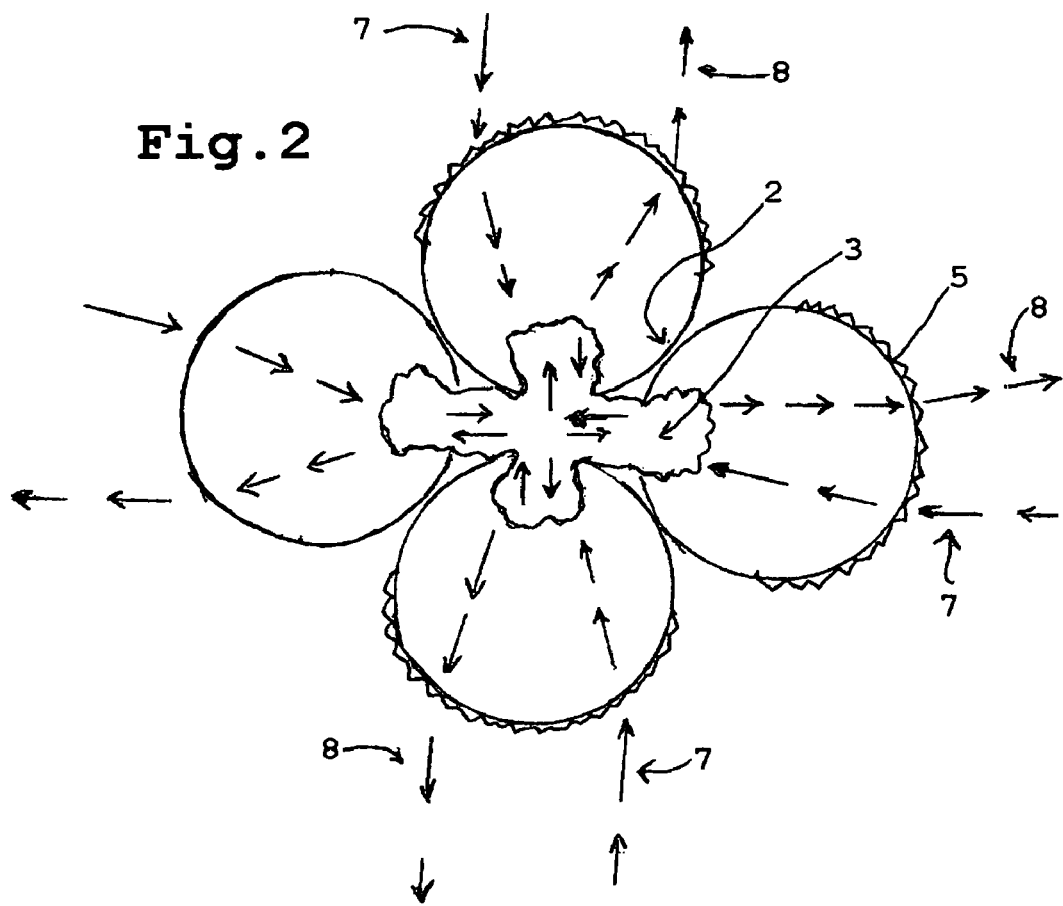

FIG. 2. Illustrates four reflecting spheres seen from above, able to emit light in multiple directions irrespective of whether one or more spheres receives incoming light.

Figure 3:
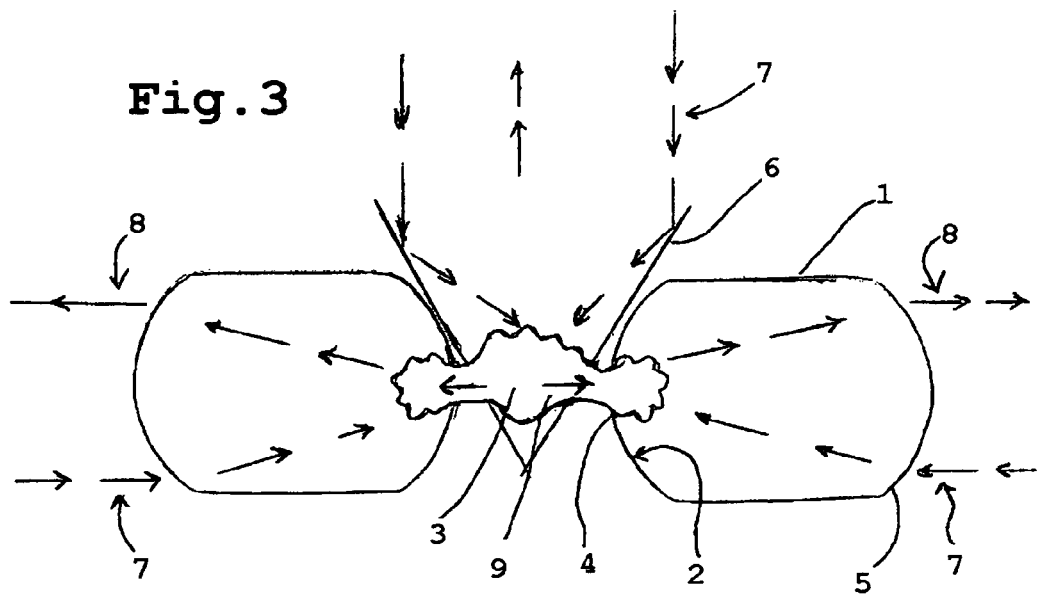

FIG. 3. Depicts how a light collecting device in the form of a reflector collects light in order to luminesce a body in order to provide light to reflecting lenses or other safety reflectors.

Figure 4:
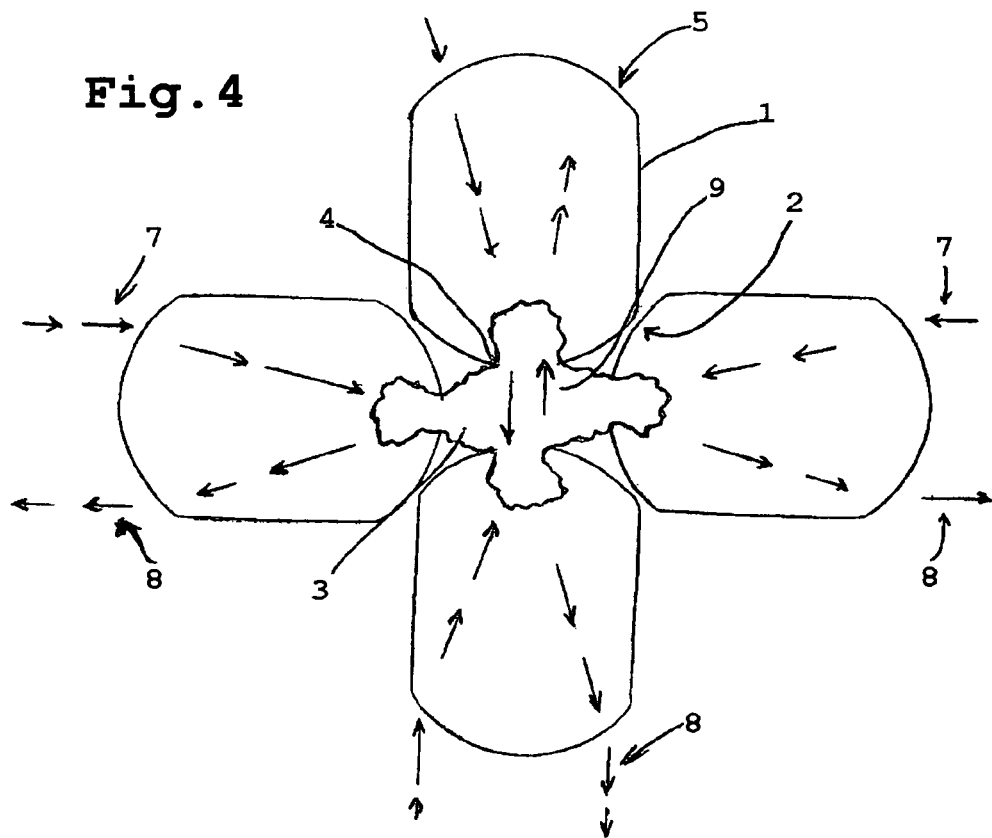

FIG. 4. Exemplifies an aerial view of how one or more reflecting lenses fluoresce a centrally placed body enabling dispersion of light in all directions.

Figure 5:
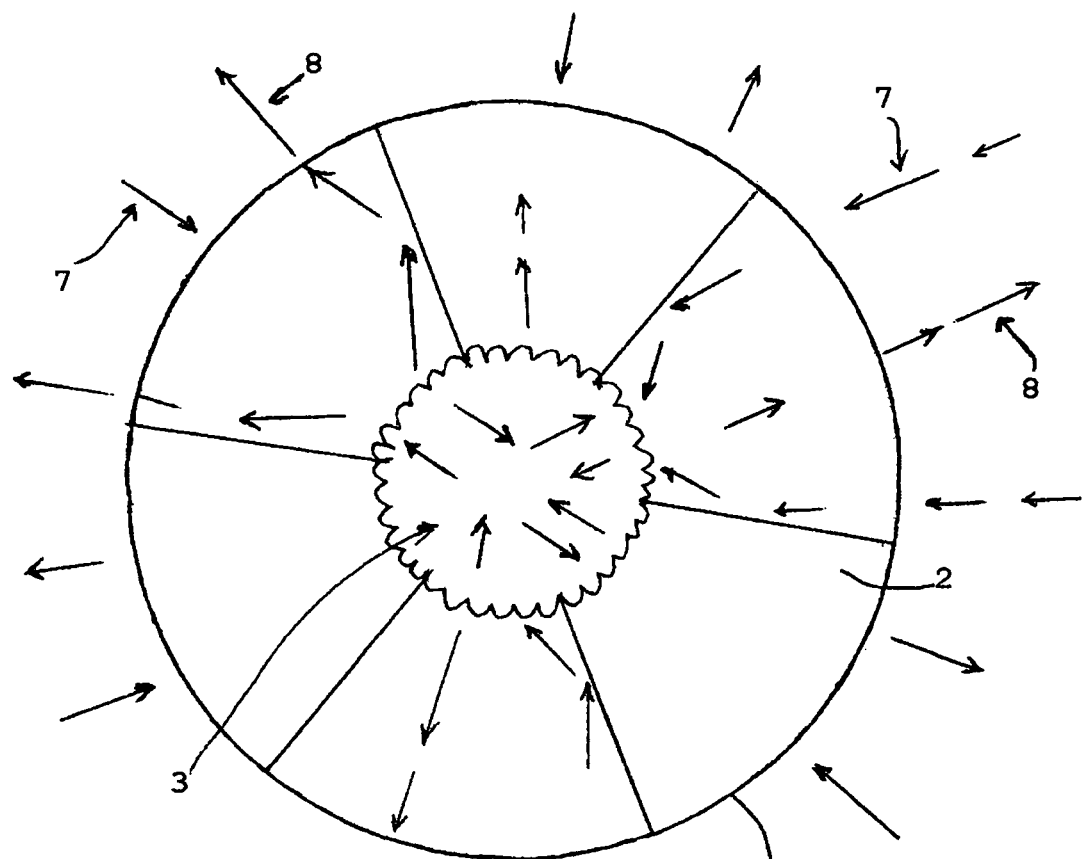

FIG. 5. Shows a top view of a versatile safety reflector in the shape of a sphere or half a sphere, where reflectors have their tapered ends set in circular formation in order to receive and emit energy to a luminescent or fluorescent body.

Figure 6:
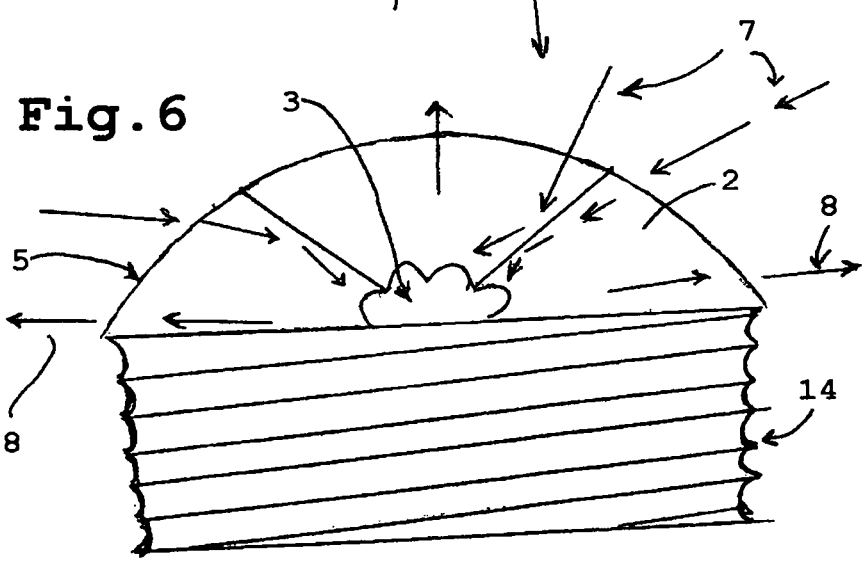

FIG. 6. Symbolizes FIG. 5 as seen from the side in cross section, in the form of a circular road stud including an attaching portion for bonding with asphalt or cement.

Figure 7:
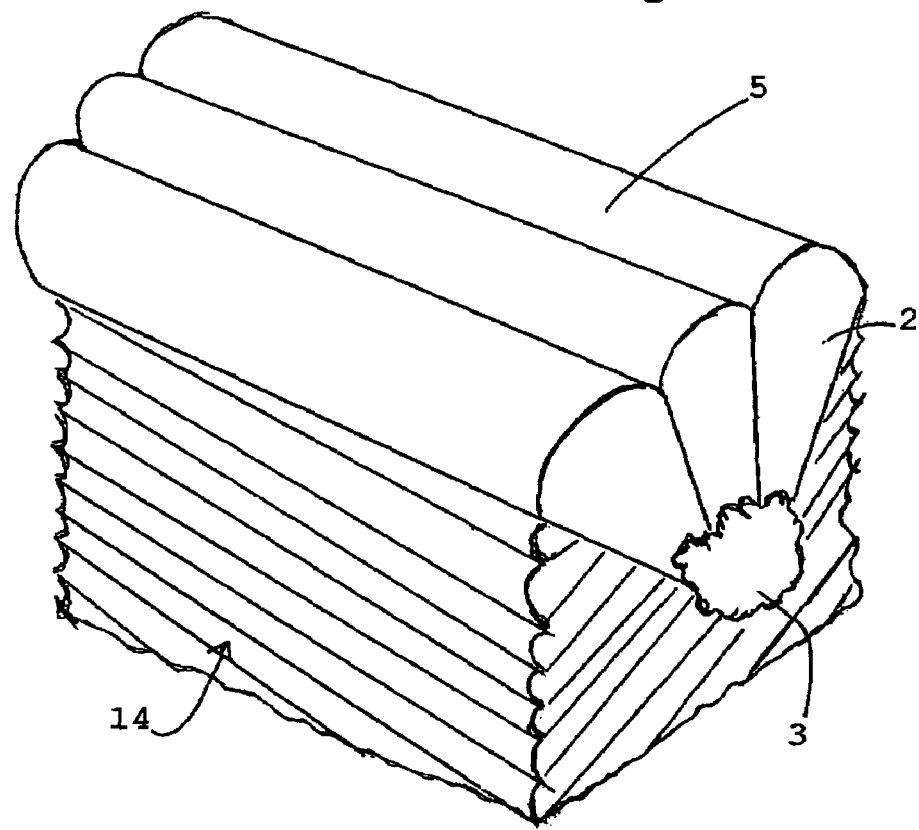

FIG. 7. Typifies a perspective view of a safety road stud marker with an exposed foreground side in order to see part of the interior. All reflectors are joined at their tapered ends by luminescent material.

Figure 8:
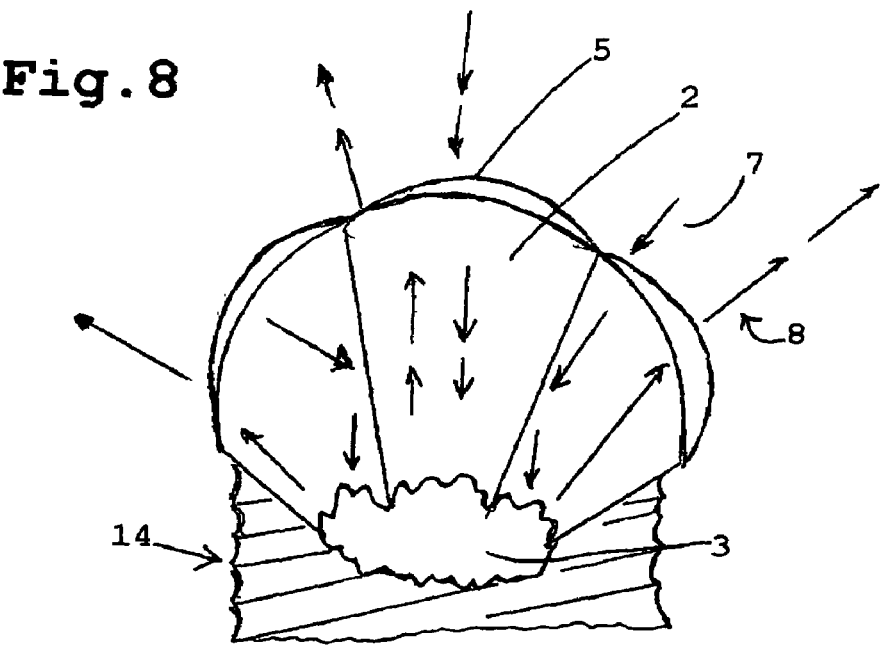

FIG. 8 Shows a cross sectional side view of FIG. 7.

Figure 9:
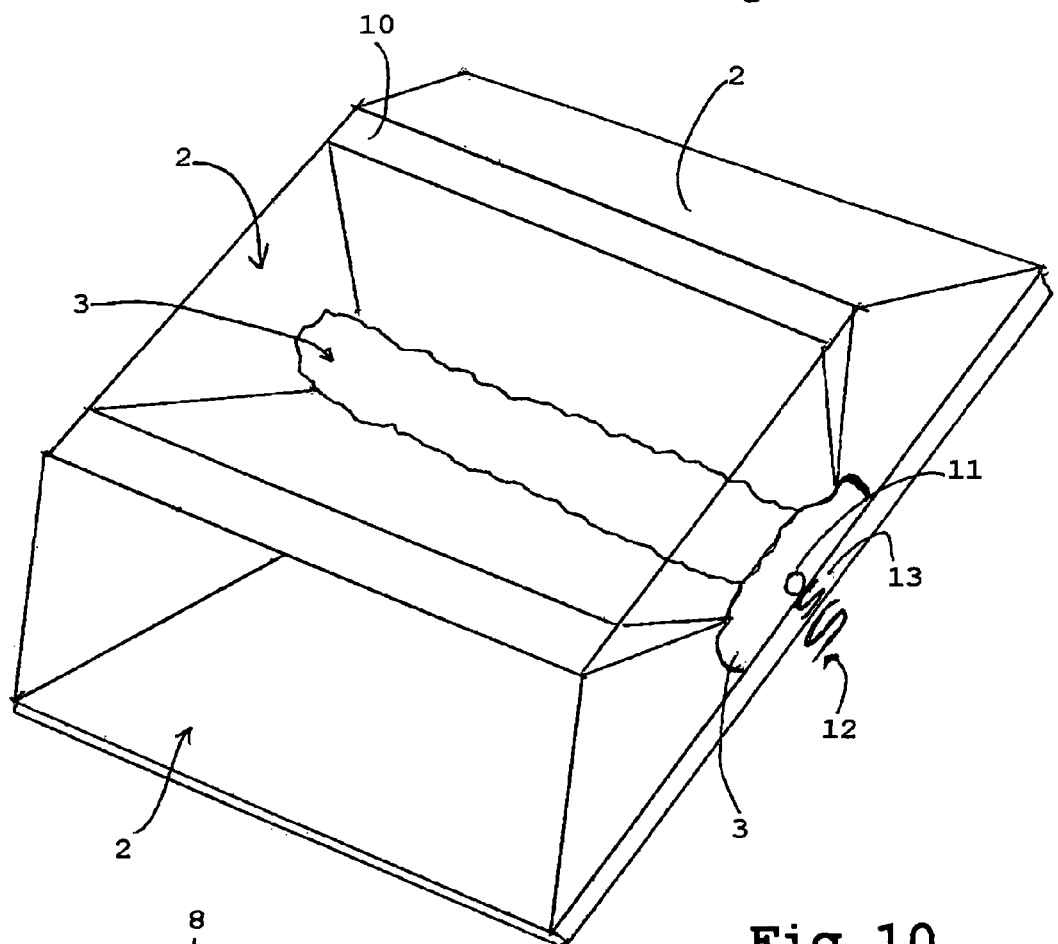

FIG. 9. Show a perspective view of a safety road stud composed of light receiving and emitting trough reflectors, together with a diode lamp, solar cell and energy transferring coils.

Figure 10:
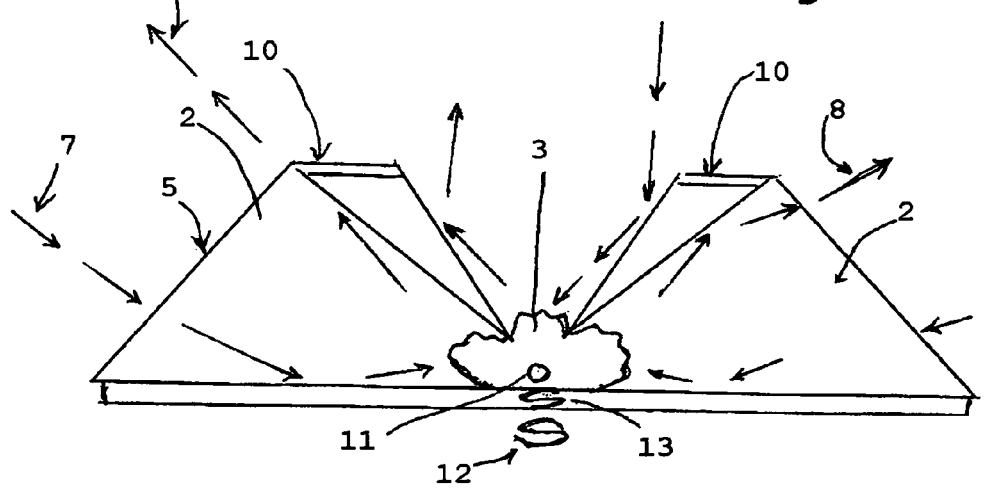

FIG. 10. Depicts a cross-sectional side view of FIG. 9.

Figure 11:
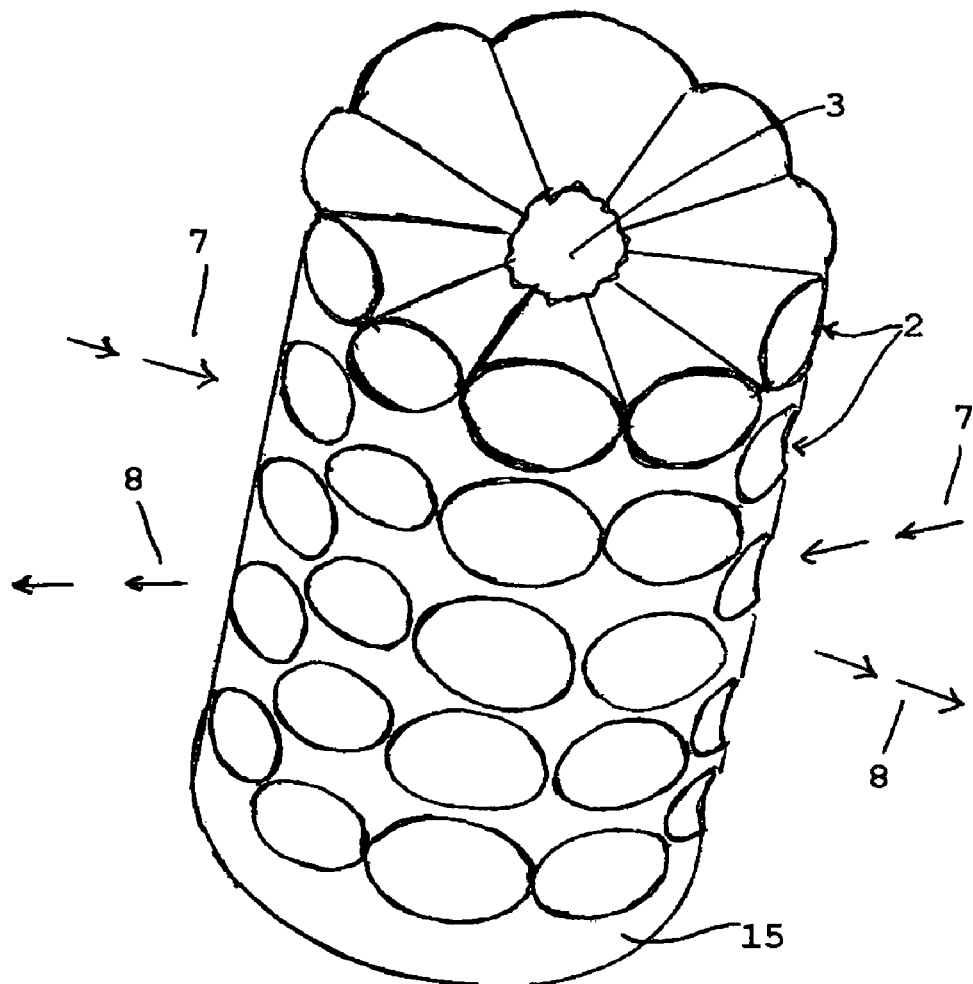

FIG. 11. Shows a perspective view a safety reflector in the shape of a pole/pylori. Several circular sets of adjoining reflectors are arranged in layers.

Figure 12:
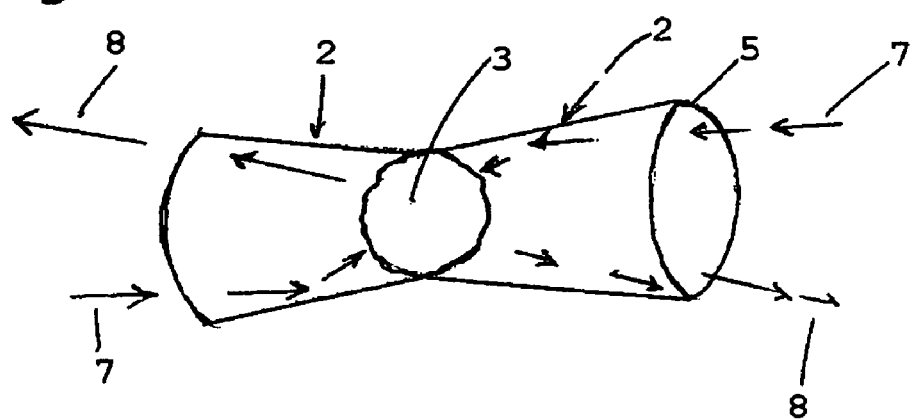

FIG. 12. Illustrates a cross-sectional side view of how light is conveyed around a pole's circumference, from one side to the next or vice versa.

Figure 13:
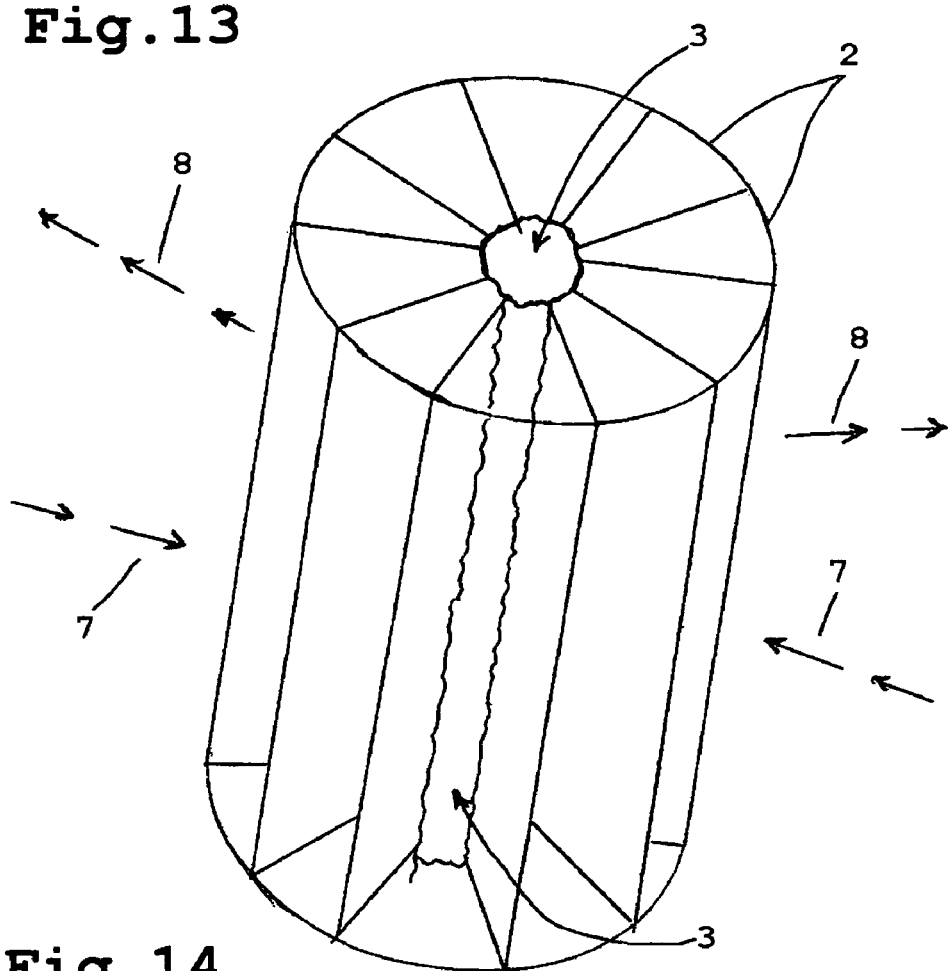

FIG. 13. Shows a perspective view of a reflecting pole or stick made up by trough reflectors set in circular formation around a mid portion composed of luminescent material.

Figure 14:
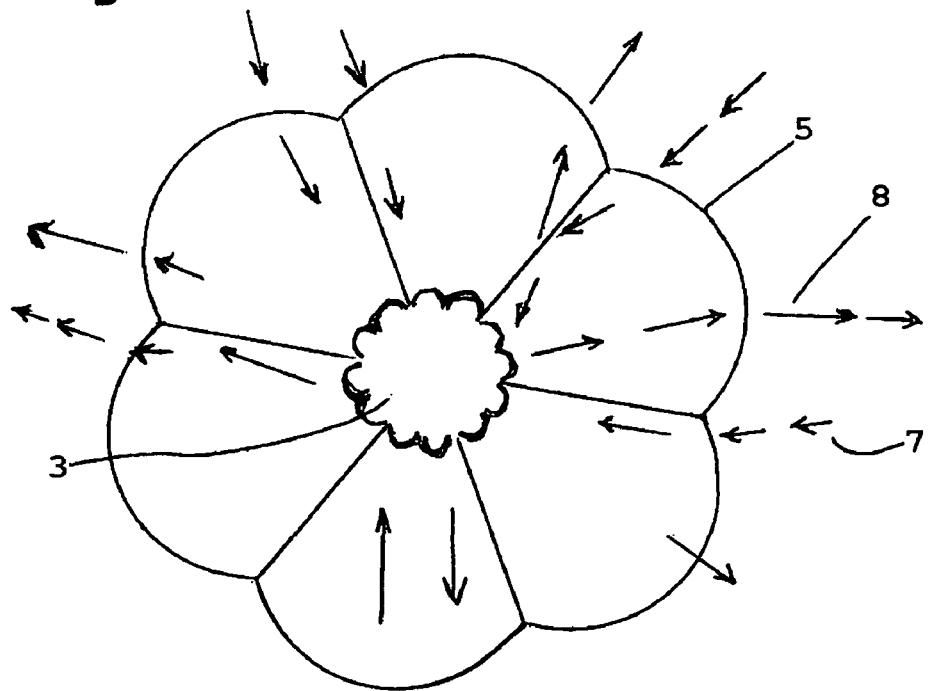

FIG. 14. Demonstrates the interior of FIG. 13. and shows prismatic lenses covering each reflectors larger aperture.

Figure 15:
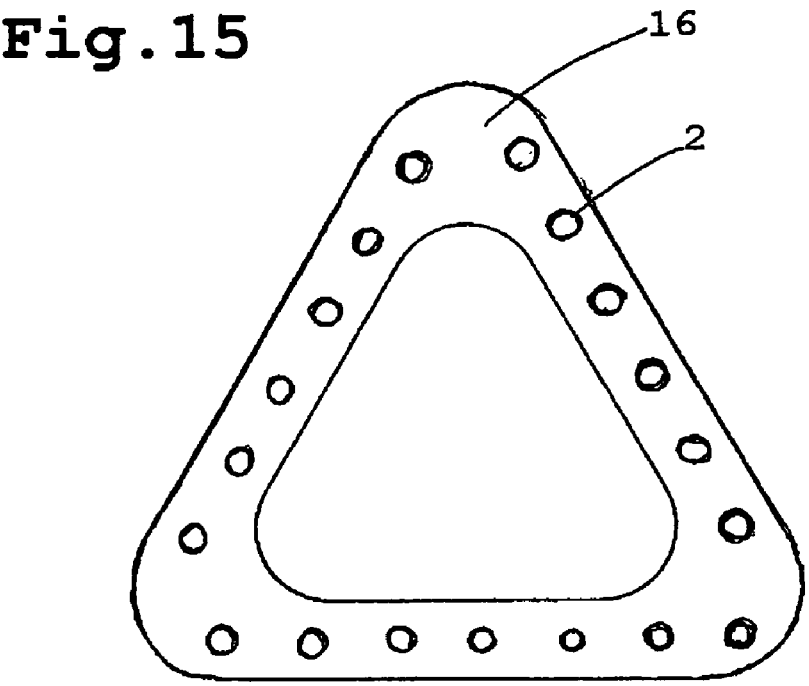

FIG. 15. Shows a front or back view of a hazard triangle able to emit light in both directions even though light emanates from one direction only.

Figure 16:
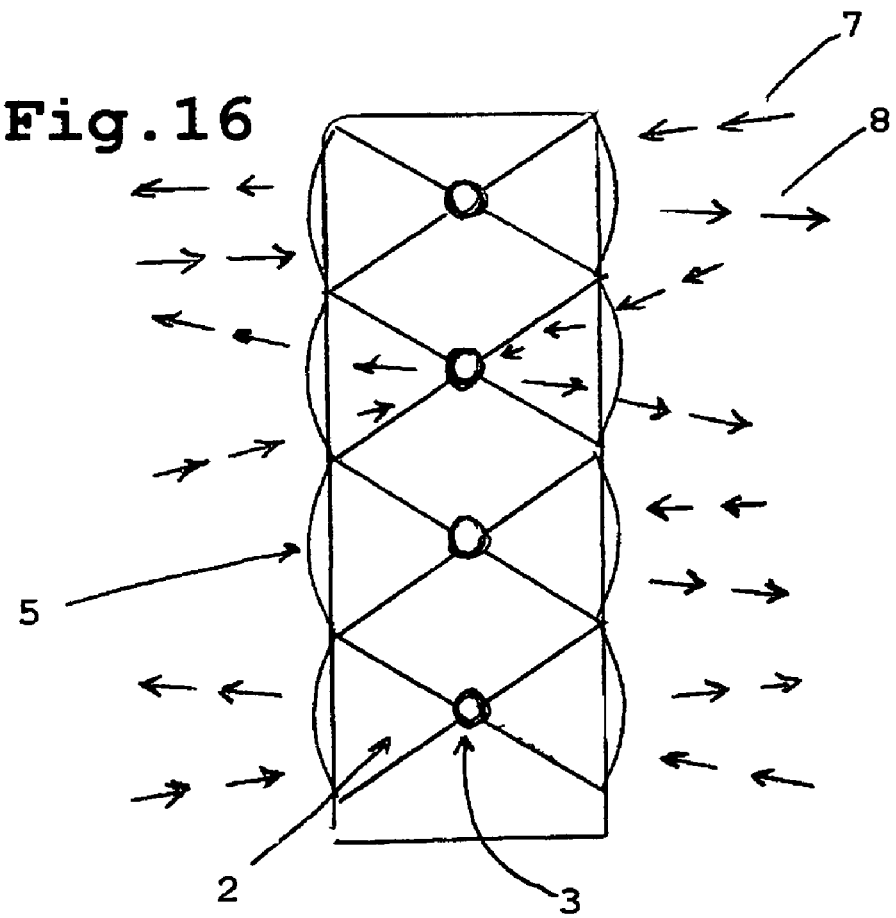

FIG. 16. Shows a cross-sectional side view of FIG. 15. Light may be received from either side in order for the hazard triangle to be seen by motorists no matter what the head-lights directional approach is. Light may also be received in between the two sides of the triangle as long as the luminescent material is exposed.

Figure 17:
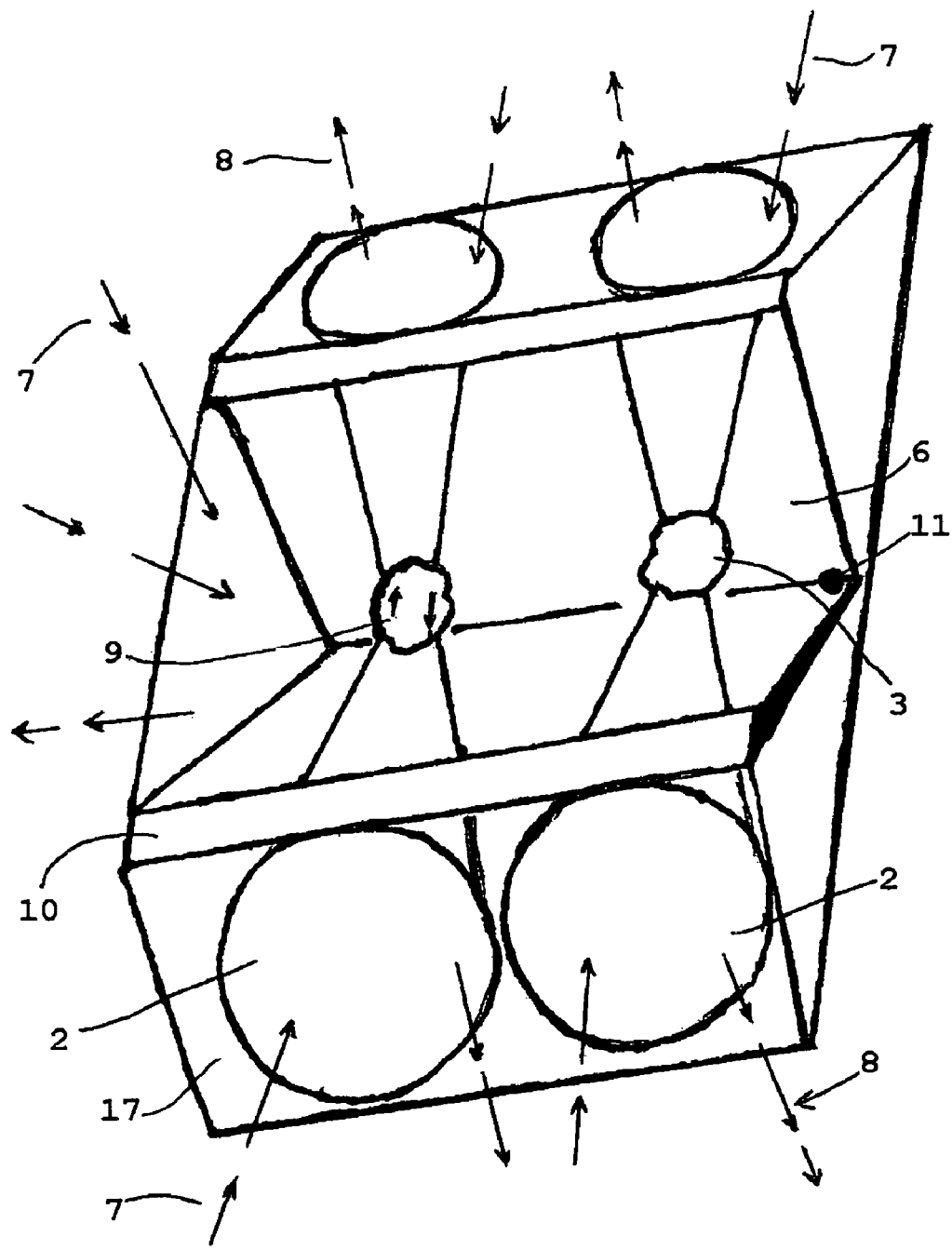

FIG. 17. Illustrates a perspective view of a modified road stud marker. Conical or pyramidal reflectors receive and transmit light from either side, as well as harnessing solar energy using trough reflectors to direct concentrated rays toward incubating luminescent/fluorescent body.

Figure 18:
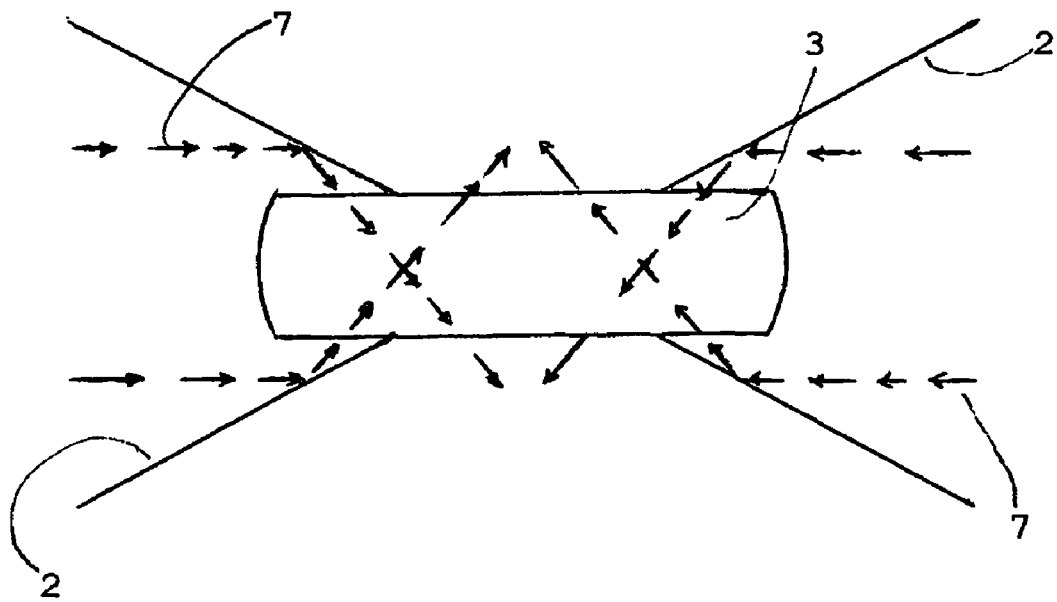
Figure 19:
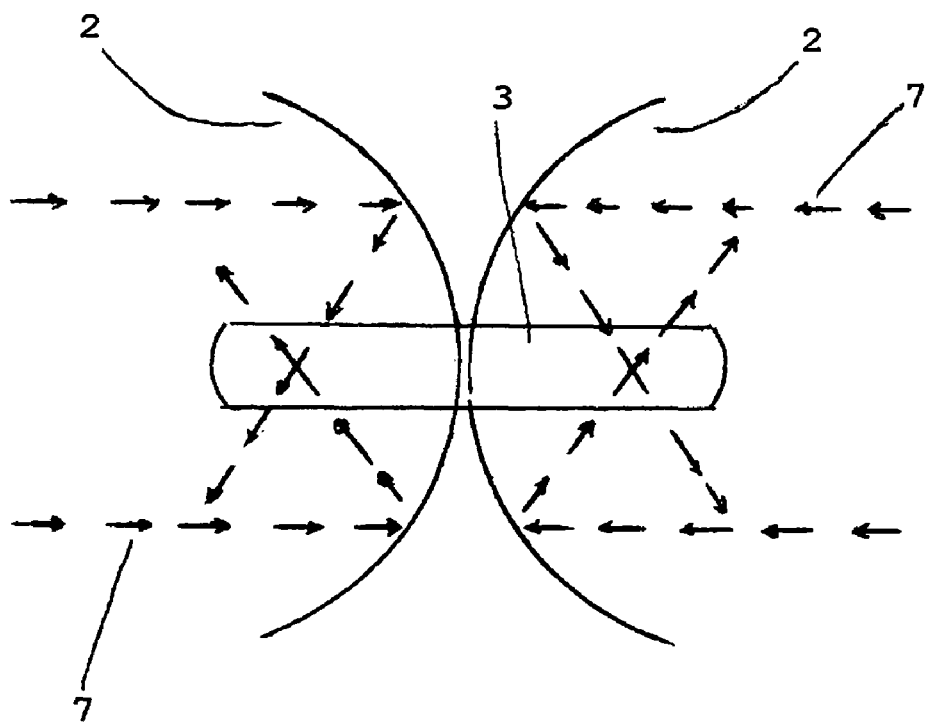
Figure 20:
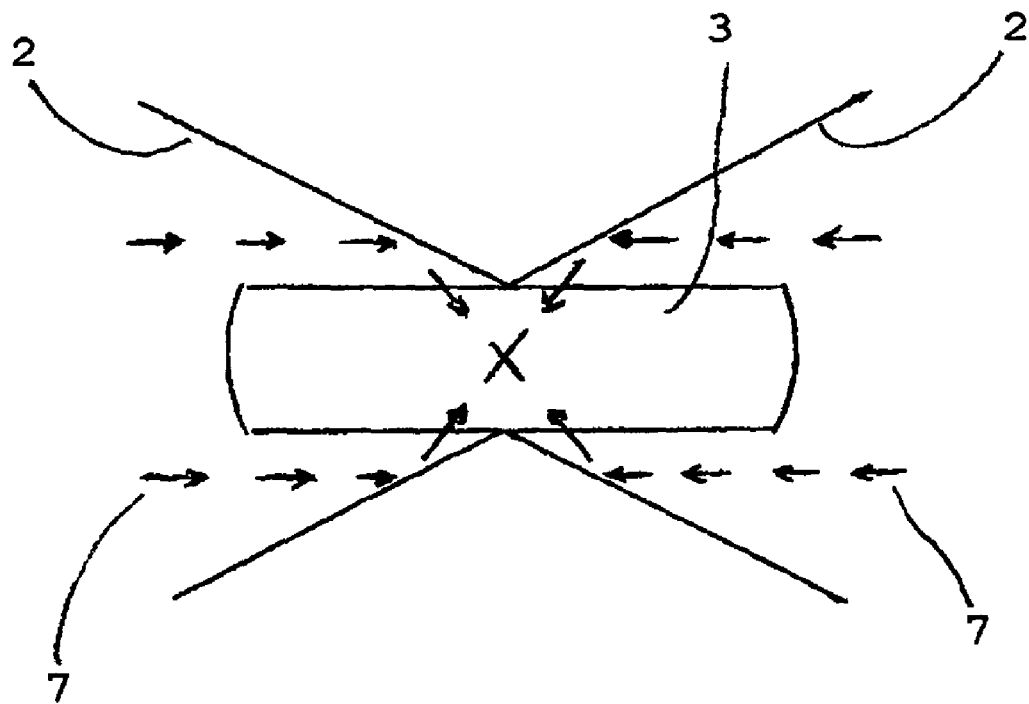

FIGS. 18, 19 and 20 show graphically areas of luminescent material receiving concentrated light, exemplified by intersecting or crossing lines.

Figure 21:
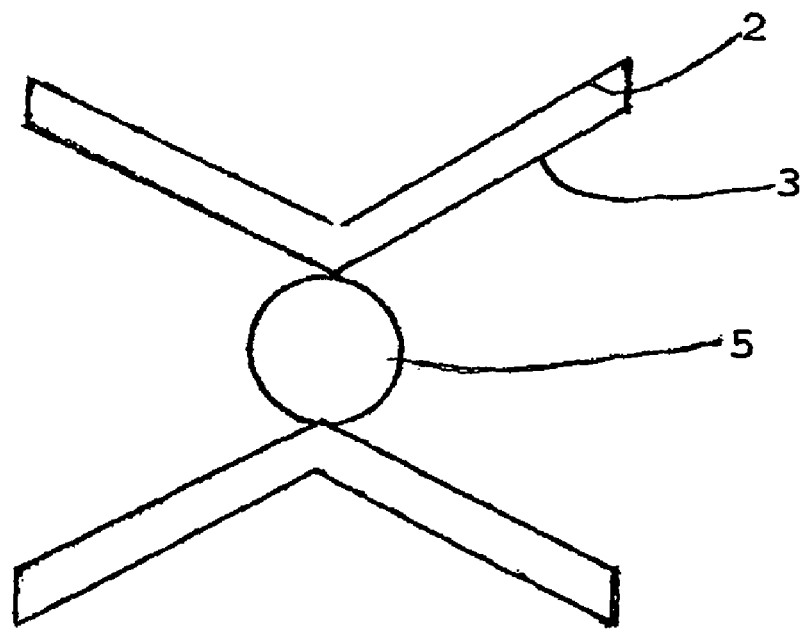

FIG. 21. Exemplifies a hyperbola having reflective surfaces lined by luminescent material, housing luminescent or standard lens or prism in tapered/converging part.

DETAILED DESCRIPTION

FIG. 1. Reflecting lenses 1, have apertures 4 in their rear concave reflecting ends 2, and are conjoined by luminescent body 3, so that received light 7 is directed by lens 5 to luminescent material 3 and reflective surface of 2, in order to both reflect light back to a source of origin and luminesce material lodged in it's vicinity. Luminescent material 3 harbours properties which excite photons or electrons to a higher energy level and thereby emit a light to all areas hosted by the material including it's neighbouring twin reflecting lens.

FIG. 2. Reflecting spheres comprise reflecting rear halves 2 including apertures or windows for interconnection of luminescent material 3, and anterior halves acting as lenses or prismatic faces 5. Received light 7 from any direction will be utilized by luminescent material 3, to create a more visible light, which is distributed throughout all adjoining spheres, and emitted 8 to four cardinal points and visible in all directions.

FIG. 3. Luminescent material 3 receives concentrated light 7 in a tapered end of a light collecting reflector 6. Luminescent light is further transcended to reflecting lenses 1, which emit light 8 through their lenses 5. Thus light is received and transmitted by all three reflectors.

FIG. 4. Four reflecting lenses 1 are connected to luminescent material 3, and all are able to receive and transmit light in all directions.

FIG. 5. A multifaceted luminescent body 3 is surrounded by reflectors 2 attached to their tapering ends resembling a sphere. Energy in the form of light enters 7 via lens or prismatic cover 5. Incidental energy causes the electrons of the atoms of the absorbing material 3 to become excited, when the electrons return to their original state, a photon of light is emitted. Produced light is of longer wavelength, than the exciting light. Absorption of invisible but intense ultraviolet components of a primary light source is made possible and emission of visible light is accomplished in all directions 8.

Certain materials within luminescent/fluorescent body 3 may be irradiated by visible light or ultraviolet light. Light becomes increasingly concentrated as it approaches tapered ends of certain reflectors such as internally reflecting cones, pyramids or trough reflectors. Because of the acute angle of the reflecting surfaces, surfaces, light is directed towards the converging ends of the reflectors and as the diameter or circumference is reduced light intensity is increased, and when it finally reaches luminescent body 3 it is near optimum. Other types of reflectors such as spherical or parabolic may also be used, but since they collect and concentrate light more anteriorly the luminescent body must be larger and longer. This spherical 360 degree configuration may also be a relatively efficient and practical way to fluoresce bodies of all sizes since even small safety reflectors made according to this description will function well and fulfill a safety purpose, and may be used as ornaments on key rings or ear rings while simultaneously acting as a protective device. Spherical safety reflectors also fit perfectly on apexes of traffic cones, pillars and obelisks. The entire structure may be filled with transparent material and/or covered by a prismatic lens or Fresnell sheet layer. It may even be combined with polarizing crystal layers actuated by small solar cells to cause visual displays such as shifts of colour or only blinking actions.

FIG. 6. Part of a reflecting sphere as shown in FIG. 5 has been mounted atop an anchoring device 14, in order to act as a suitable safety stud or pavement marker. Besides providing regular retrodirective reflecting elements or auxiliary power supply systems for additional artificial light, the device effectively uses ambient or other light 7 to fluoresce body 3 to secure an indirect light source 8 to motorists even during cloudy weather conditions.

FIG. 7. Shows a modified version of a road block or stud with prismatic faces covering reflector's 2 larger apertures, and luminescent material lodged and connecting their smaller tapering apertures, in order to supply light sources to all compartments at the same time.

FIG. 8. The drawing is a cross sectional side view of FIG. 7. showing the continuos flow of light between each reflective compartment. Any increase in light intensity 7 directed to any side will influence the transfer and emission of light 8 from all other compartments.

FIG. 9. Shows a schematic view of a road stud composed of light collecting and emitting trough reflectors 2, receiving rays of light 7 from above and from either side with the intention to luminesce material 3 housed centrally within the structure so that light may appear from all exit and entry points. Additional light may be provided by one or more diode lamps 11 in separate reflectors or work in conjunction with the present luminescent material by feeding it with ultra violet light. Diode lamps may be powered by small solar panels 10 or using induction coils transferring energy remotely from a primary coil 12 to a secondary coil 13.

FIG. 10. is a cross-sectional side view of FIG. 9, and shows the continuos in and out flow of light through the entire versatile safety reflector system.

FIG. 11. Safety reflecting poles in the shape of pylons, bollards or other posts may become more efficient by incorporating versatile safety reflectors in order for them to become more visible from all angles and sides and so by enhance safety for all commuters irrespective of private or public transport. Reflector cones, pyramids or others are arranged so that their tapering smaller apertures are affixed around a body of luminescent material, so that each set forms a circle. Each circular set in turn is mounted vertically above the next set in order to form a neat pole like structure. Poles may then be covered with suitable materials with refractive properties. Luminescent material may contain alternating colours with in each reflecting set along it's length, and contain filters which cause polarization of light when fed small currents from a solar cell or using high energy fields or induction techniques. Once this has been set up as desired the poles will flash at various apertures at different time intervals.

FIG. 12. Depicts a cross-sectional side-view from one layer of the reflecting circular sets shown in FIG. 11. Luminescent body 3 may be spherical, multi-faceted and/or of regular or irregular shape. Light 7 enters from any angle and is distributed to interconnecting reflectors 2, and then further reflected outward 8.

FIG. 13. Shows a perspective variation of FIG. 11. Instead of horizontal sets of tapering reflectors set in circular formation, vertical reflecting blades fan out from a mid zone filled with luminescent material 3. Reflecting troughs 2 resemble A-frames that run perpendicular to the poles and surround 180 degrees of their circumference. The poles outer perimeters have large oblong aperture entrances covered by lenses or prisms that allow light to enter 7 in order to excite material housed within luminescent body 3. Photons are then released into interconnecting reflecting chambers and appear as visible light 8 to an observer.

FIG. 14. The drawing shows a cross-section of a pole as described in FIG. 13, with the addition of bulging lenses or prisms 5 used to capture and direct light rays 7 and 8.

FIG. 15. Shows an example of a portable hazard safety triangle commonly used by motorists to alert oncoming traffic of a break-down ahead. One or more rows of versatile safety reflectors follow the length of each side of the triangle. Received light 7, is not only reflected back to the point of origin, but also toward the rear of the triangle 8, making it visible to traffic approaching from both directions. Since light may also be received and transmitted through the gap of the narrow sides of the triangle and reach exposed parts of the luminescent body, these areas may be provided by optical enhancing devices.

FIG. 16. Shows a cross-sectional side-view of a hazard triangle as described in FIG. 15.

FIG. 17. Shows a general perspective view of a road stud, commonly referred to as cat eyes among road administrators, because the road markers have a retro-reflective lens that reflect light in ways that resemble retinas eyes.

Versatile safety reflectors may work in conjunction with regular retro-reflectors or on their own. The example depicted shows four tapering conical or pyramidal reflectors 2. Two reflectors are placed on either side of a central light collecting trough reflector 6. Luminescent material 3 has connecting branches to all five reflectors converging open aperture ends, aiding and guiding light to pass between them 9 and their umbilical twin reflector on the opposing side. The combination and number of reflectors may of course be changed, such as using trough reflectors on the sides and circular tapering reflectors above, or using only conical, pyramidal, spherical or paraboloid varieties.

Combining or mixing primary colours may produce a spectrum of colours including white light. White light may be obtained by mixing the three primary colours red, green and blue. Luminescent bodies shaped as spherical lenses may produce focal points of bright coloured light, and when these merge white light is formed. The production of white light will be of benefit when the object is enhance the appearance of white road markers or studs. Clear uncoloured spherical lenses lodged in tapered ends of light receiving reflectors will also emit a brighter light. Transparent dowels or rods mounted in converging ends of elongated trough reflectors may also act as lenses to direct light, and these may be coloured or clear to achieve similar results. Increased visibility of the layout of roads using a variety of versatile reflector systems will inform as well as improve operators of vehicles reaction times, and so by reduce accidents and save lives.

FIG. 18. Shows an example of optimal placement of luminescent material in order to receive maximum exposure to concentrated rays of light. Light rays 7. enter from either side of a hyperbola, cone or pyramid reflector, and is collected, guided and concentrated toward luminescent body member 3. Rays tend to decussate and congregate within a confined space, on either side of the tapering adjoining reflective surfaces.

FIG. 19. Demonstrates optimal placement of luminescent body member as in FIG. 18, but using concave or parabolic reflectors instead. Light rays 7, tends to concentrate more anteriorly. That is, light concentrates proximally, whereas in FIG. 18 it is guided distally.

FIG. 20. Illustrates a reflector arrangement working in concert to project concentrated light toward a central point. Light rays 7, enter from either side in order to merge in a shared confined area within luminescent body member 3.

FIG. 21. Shows hyperbolic reflective surfaces lined by luminescent material, housing a lens or prism 5.

The invention claimed is:

1. A versatile safety reflector system comprising:
   at least two adjoining reflectors; and
   a fluorescent body,
   wherein each reflector is a hollow reflector or a reflector filled with transparent material,
   wherein each reflector is tapered from a diverging end to a converging end,
   wherein the diverging end of each reflector is open,
   wherein the converging end of each reflector contains an aperture,
   wherein the reflectors and the fluorescent body are positioned such that the fluorescent body is lodged within all apertures,
   wherein the fluorescent body absorbs incident light coming from at least one angle of incidence,
   wherein the fluorescent body emits light through each reflector, irrespective of the angle of incidence of the incident light, and
   wherein the system harnesses external surrounding ambient light.

2. A versatile safety reflector system as in claim 1, wherein at least one reflector is one of concave, parabolic, conical, and pyramidal in shape.

3. A versatile safety reflector system as in claim 1, wherein at least one of the reflectors is able to merge primary colors in order to produce white light.

4. A versatile safety reflector system as in claim 1, wherein at least one of the reflectors has one of a prism and a lens fitted in or near its converging end.

5. A versatile safety reflector system as in claim 1, wherein the system emits light over a 360-degree range, irrespective of the angle of incidence of the incident light.

6. A versatile safety reflector system as in claim 1, wherein the system serves as at least one of a road stud, a pavement marker, a bollard, a verge marker, a traffic cone, a pylon, a guard rail and a lane marker.

7. A versatile safety reflector system as in claim 1, wherein the system is mounted on at least one of a bike and another vehicle.

8. A versatile safety reflector system as in claim 1, wherein the system is paired with at least one of a key ring and personal attire.

9. A versatile safety reflector system as in claim 1 further comprising, at least one auxiliary diode light, wherein the at least one auxiliary diode light is powered by at least one solar cell.

10. A versatile safety reflector system as in claim 1, wherein at least one of the reflectors has one of a prism, a Fresnell lens, a polarizing lens, and another lens fitted in or near its diverging end.

11. A versatile safety reflector system as in claim 1, wherein the system receives light of short wavelength and emits light of longer wavelength.

12. A versatile safety reflector system as in claim 1, wherein the reflectors contain different metals, and wherein the fluorescent body is able to receive thermoelectric current.

13. A versatile safety reflector as in claim 1, wherein at least one of the reflectors is lined by fluorescent material.

14. A versatile safety reflector system as in claim 1, further comprising at least one auxiliary diode light, wherein the at least one auxiliary diode light is powered by an induction coil.

* * * * *